United States Patent [19]

Hickey

[11] 4,009,850
[45] Mar. 1, 1977

[54] AIRSHIP TANKERS
[76] Inventor: John J. Hickey, 93 Revere St., Boston, Mass. 02114
[22] Filed: Apr. 21, 1975
[21] Appl. No.: 570,176
[52] U.S. Cl. .............................. 244/115; 244/125; 244/136
[51] Int. Cl.² ........................................ B64F 3/00
[58] Field of Search ................. 244/24, 25, 30, 94, 244/95, 96, 115, 135 A, 136, 137 R, 125, 128; 242/86; 137/355.2, 355.21, 355.22, 355.23, 355.16; 114/74 R, 74 A; 220/9 A, 5 RA, 16

[56] References Cited
UNITED STATES PATENTS

| | | | |
|---|---|---|---|
| 1,848,372 | 3/1932 | Moran | 244/135 A |
| 1,856,446 | 5/1932 | Vingheroets | 244/115 |
| 1,861,780 | 6/1932 | Bowers | 244/115 |
| 1,925,212 | 9/1933 | Steiber | 244/135 A |
| 2,896,659 | 7/1959 | Erikson | 137/355.23 |
| 2,995,321 | 8/1961 | Zeitler | 244/135 A |
| 3,011,321 | 12/1961 | Clauson | 114/74 A |

FOREIGN PATENTS OR APPLICATIONS

| | | | |
|---|---|---|---|
| 740,334 | 11/1955 | United Kingdom | 244/135 A |
| 223,746 | 10/1924 | United Kingdom | 244/115 |

OTHER PUBLICATIONS
"Airplanes and Tanks in the Next War," *Science and Invention*, Sept. 1925.

Primary Examiner—George E. A. Halvosa
Assistant Examiner—Galen L. Barefoot

[57] ABSTRACT

Airships for transporting liquid have storage tanks located amidship with their inlet conduits opening through the forward part of the upper deck enabling the tanks to be filled while an airship is moored to a special tower. The tank contents are discharged through outlet conduits that are lowered to the receiving station. Where different liquids are to be carried, the tanks are arranged to minimize ballasting problems during loading and unloading. In one embodiment, the tank has a plurality of outlet conduits and each is provided with a nozzle. The several nozzles are secured to a holder that is raised and lowered with the conduits.

11 Claims, 13 Drawing Figures

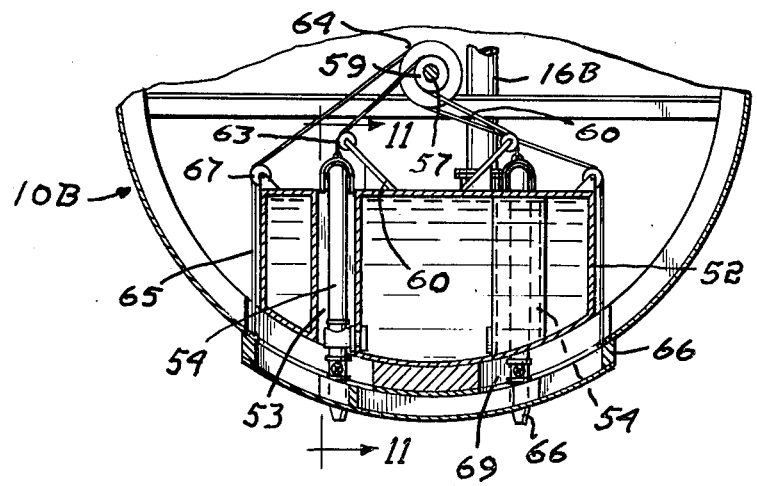
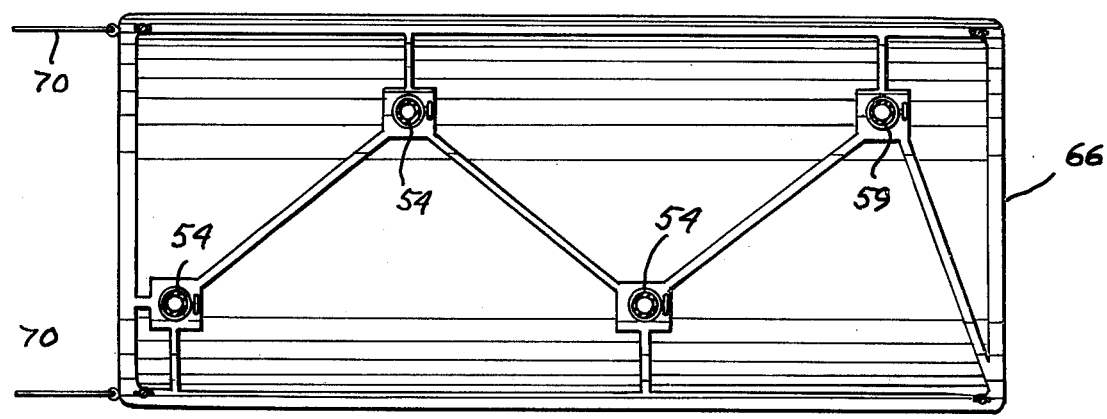
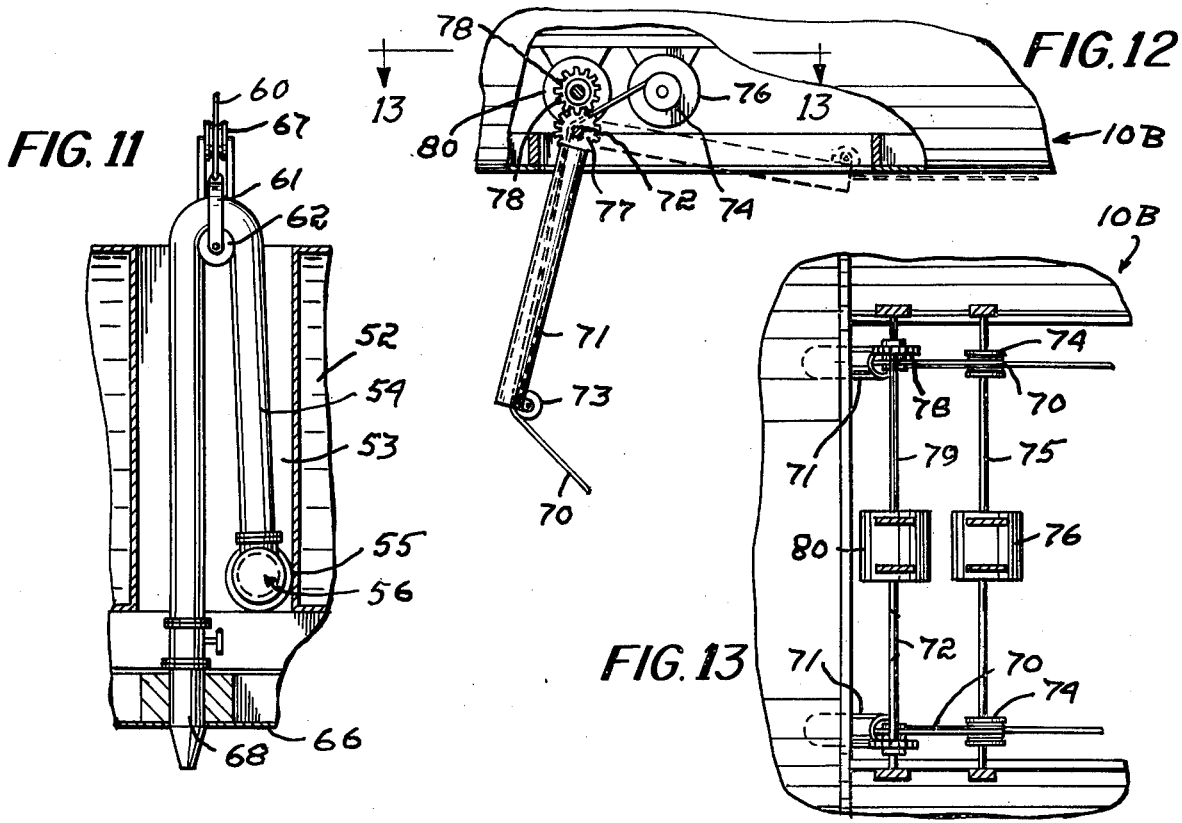

AIRSHIP TANKERS

BACKGROUND REFERENCES

U.S. Pat. No. 1,492,128;
U.S. Pat. No. 1,856,446;
U.S. Pat. No. 1,935,672
"Airship Argosies Are the Answer"— "The Illustrated London News," July 7, 1970;
"Nuclear Power For Airships — Old Idea Has New Possibilities"— "Nucleonics" December, 1965;
"The Zeppelin In the Atomic Age" — Edward J. Kirshner, 1957.

Background of the Invention

The need for rapid but low cost transportation has, within the last few years, resulted in airships again being considered by many as a likely solution.

Modern materials, construction techniques, and fuels indicate that large airships capable of carrying substantial loads are entirely feasible. For example, in the article entitled "Airship Argosies Are the Answer" it is stated that "the Soviets are thinking in terms of nuclear-engined airships with 500 to 1,000 ton payloads."

While airships of modern design would of course be well suited for use in passenger service, their adaptability to meet various problems in handling cargo of various types is the factor with which the present invention is concerned. By way of example, reference is made to "The Wall Street Journal" of Oct. 2, 1974, "Interest In Lighter-than Air Transport Revives Because of Economic Needs, New Technology," in which the possible development of a tanker version of a dirigible to transport natural gas was discussed. The article noted that "Ocean-going tankers and equipment to liquify natural gas are 'hideously expensive.'"

Another example given in that article is the problems presented when nuclear power plants are to be located in areas where no adequate transport by land or sea is available for the heavy equipment required. To avoid building adequate roads or building fields for large aircraft at such areas, a Boeing 747, for example, airships could be used to advantage.

The Present Invention

The general objective of the present invention is to provide for airship transportation of liquids of which both water and oil are presently the most important examples.

Before considering the attainment of the above objectives, some of the problems of liquid transportation should be here noted. In the case of oil, it is of course, generally appreciated that tanker transportation involves the risk of serious oil spills but has the advantage that large volumes may be carried. Pipe lines are also efficient but expensive and leakage, particularly when serving oil fields in the arctic region, is a source of concern.

In the case of water, transportation is usually not a problem except in the case of forest fires or disaster areas where domestic water systems are broken as by an earthquake or contaminated by flooding.

The general objective of the invention, with the above in mind, is attained with an airship having a storage tank or tanks located amidship and of a capacity appropriately related to the size and construction of the airship. The tank or tanks are filled by conduits having their inlet ends opening through the upper deck of the airship relatively near its nose. Each tank is drained by a discharge conduit that is lowered to a subjacent receiving station over which the airship hovers and is then hauled in after the load has been discharged.

A mooring mast at the loading site has a turntable to which the nose of the airship is secured and a rotatable boom located and dimensioned to overlie the nose end thereof, the boom supporting the conduit by which liquid from a pump controlled source is discharged into the inlet conduit of a tank.

Another objective of the invention is to enable different liquids to be carried at the same time without causing ballasting problems, an objective attained with one tank located inside another, each tank having its own discharge conduit. Desirably, but not necessarily, the discharge conduits are connected to a common nozzle.

When an airship is to be used to fight forest fires, spray drought areas, or for civil defense purposes, by way of examples, each tank is drained through a series of nozzles attached to a holder that is raised or lowered and is also provided with means stabilizing it when lowered.

BRIEF DESCRIPTION OF THE DRAWINGS

In the accompanying drawings, preferred embodiments of the invention are shown of which:

FIG. 9 is a section taken approximately along the indicated line 9—9 of FIG. 8;

FIG. 10 is a section taken approximately along the indicated line 10—10 of FIG. 8;

FIG. 11 is a section taken approximately along the indicated line 11—11 of FIG. 10;

FIG. 12 is a fragmentary side view of the airship of FIG. 8 partly sectioned to show stabilizing means for the nozzle holder; and FIG. 13 is a section taken approximately along the indicated line 13—13 of FIG. 12.

THE PREFERRED EMBODIMENT OF THE INVENTION

Figure 1:
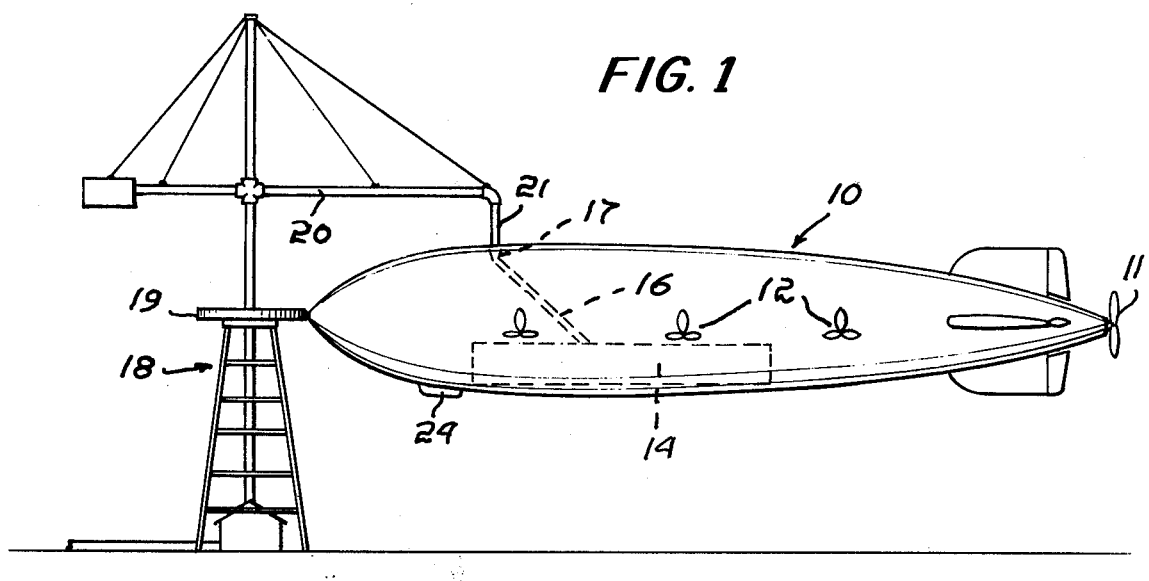
FIG. 1 is a somewhat schematic side view of an airship in accordance with the invention moored at a loading station.

An airship in accordance with the invention is generally indicated at 10 and its construction is not detailed as it may be of conventional design or its construction may be in accordance with proposals made here or abroad for much larger airships. It may be nuclear powered and is shown as having, as proposed in "Airship Argosies Are the Answer," in addition to its main propeller 11, a series of auxiliary maneuvering propellers 12 spaced along each side and so mounted that the direction of their effect may be adjusted throughout 360°.

The airship 10 has an upper deck 13 and a tank 14 located amidship and supported by the framework 15. The conduit 16 by which the tank 14 is filled extends forwardly and upwardly and is provided with a capped filling port 17 exposed in the upper deck 13 relatively near the nose of the airship 10.

A mooring tower at a loading station at an off-shore drilling site, for example, is generally indicated at 18 in FIG. 1 and is provided with a turntable 19 to which the nose of the airship is detachably secured and with a counterweighted boom 20 above the turntable 19 and free to turn through 360°. A conduit from a pump controlled source, now shown, of the liquid to be shipped, oil in the disclosed embodiment, includes a delivery section 21 extending through the boom 20 and free to turn therewith. The boom 20 is dimensioned to extend aft into a position in which the discharge end of the section 21 may be entered into the filling port 17, the forward location of which enables the boom length to be within practical limits. At least the exposed portion of the conduit section 21 is flexible and of sufficient length to ensure that it remains connected to the conduit 16 should the moored airship move as it is receiving its load.

A discharge conduit 22 has a valve controlled connection 23 with the tank 14, adapted to be operated from the cabin 24 and the swivelled nozzle 25 of the conduit 22 is also provided with a valve 26 adapted to be operated from the receiving station. The conduit 22 is flexible and is normally stored within a chamber 27 as a loop extending lengthwise of the airship and trained about a pulley 28 secured by a yoke 29 to a cable 30 wound about the drum of a motor driven winch, generally indicated at 31. The conduit 22 is also trained over a guide roller 32 adjacent the port 33 which is normally closed by the nozzle 25.

Figure 2:
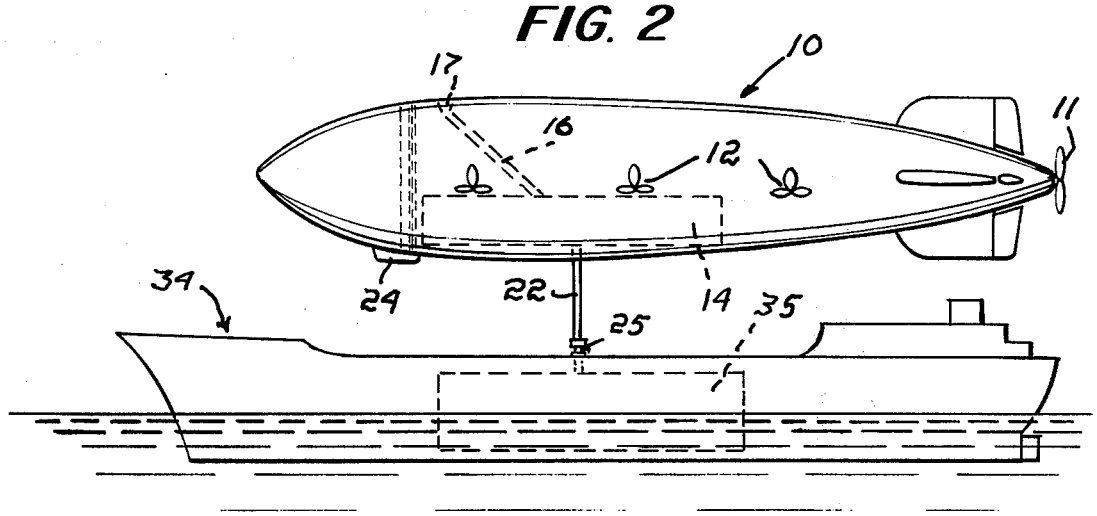
FIG. 2 is a like view of the airship at an unloading station.
Figure 3:
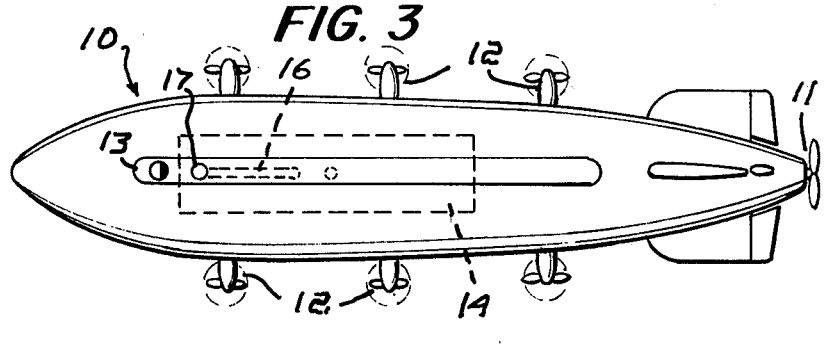
FIG. 3 is a somewhat schematic top plan view of the airship.
Figure 4:
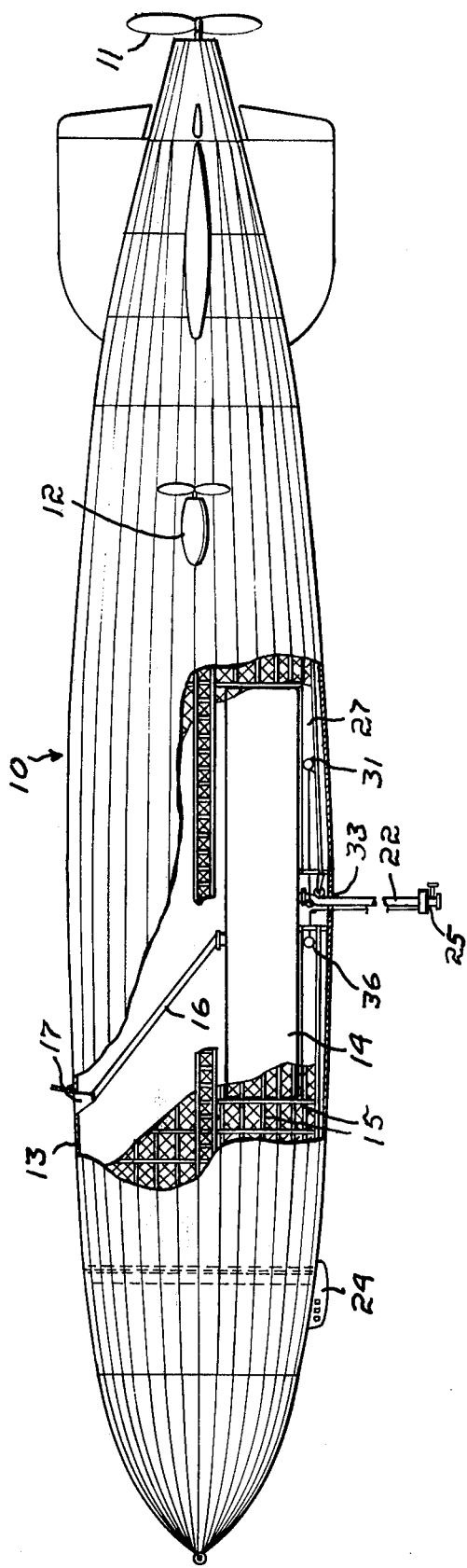
FIG. 4 is a side view of the airship, on an increase in scale, and partly broken away to show somewhat schematically the means by which the tank is filled and its contents discharged.
Figure 5:
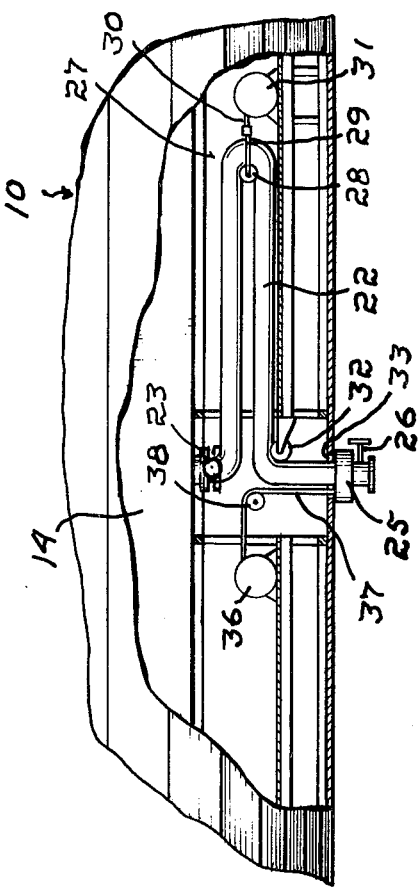
FIG. 5 is a fragmentary view on a further increase in scale, showing means for raising and lowering the discharge line.

When the airship 10 reaches a receiving station, a conventional coastal tanker 34, see FIG. 2, for one example, it hovers at the appropriate height and the winch 31 is operated to feed out the conduit 22 until its nozzle 25 may be placed in communication with the selected tank 35 of the tanker 34 with the valves 23 and 26 then opened to transfer the oil. The length of the conduit 22 is such to ensure the safe transfer of the oil, even with the tanker 34 underway. After the tank 14 is emptied, the valves 23 and 26 are closed and the winch 31 operated to haul the conduit 22 inboard and to seat the nozzle 25 to again close the port 33. An additional winch 36 has a cable 37 trained over a pulley 38 and connected to the nozzle 25 and the two winches are operated simultaneously.

Figure 6:
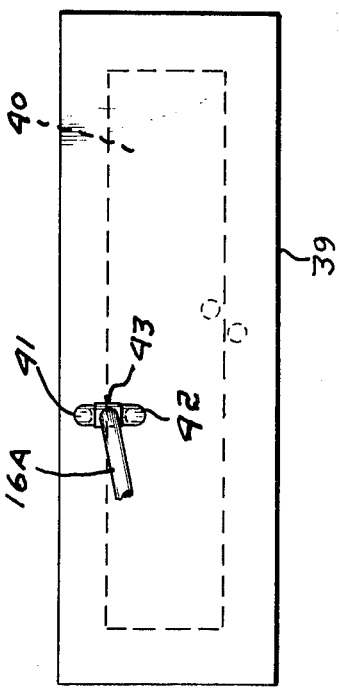
FIG. 6 is a fragmentary plan view of a double tank construction.
Figure 7:
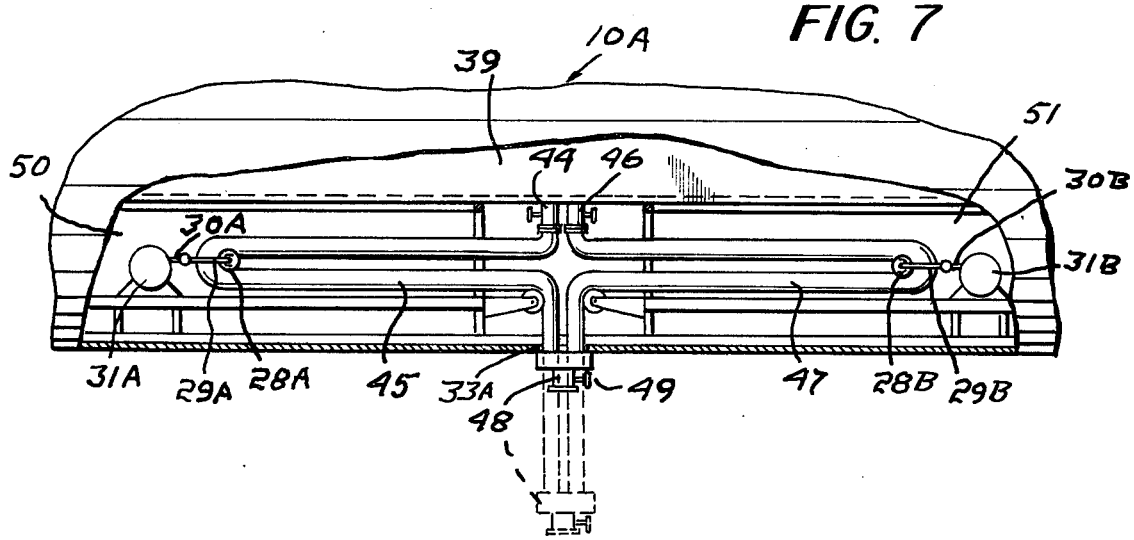
FIG. 7 is a fragmentary side view, on an increase in scale of an airship equipped with the double tank of FIG. 6.
Figure 8:
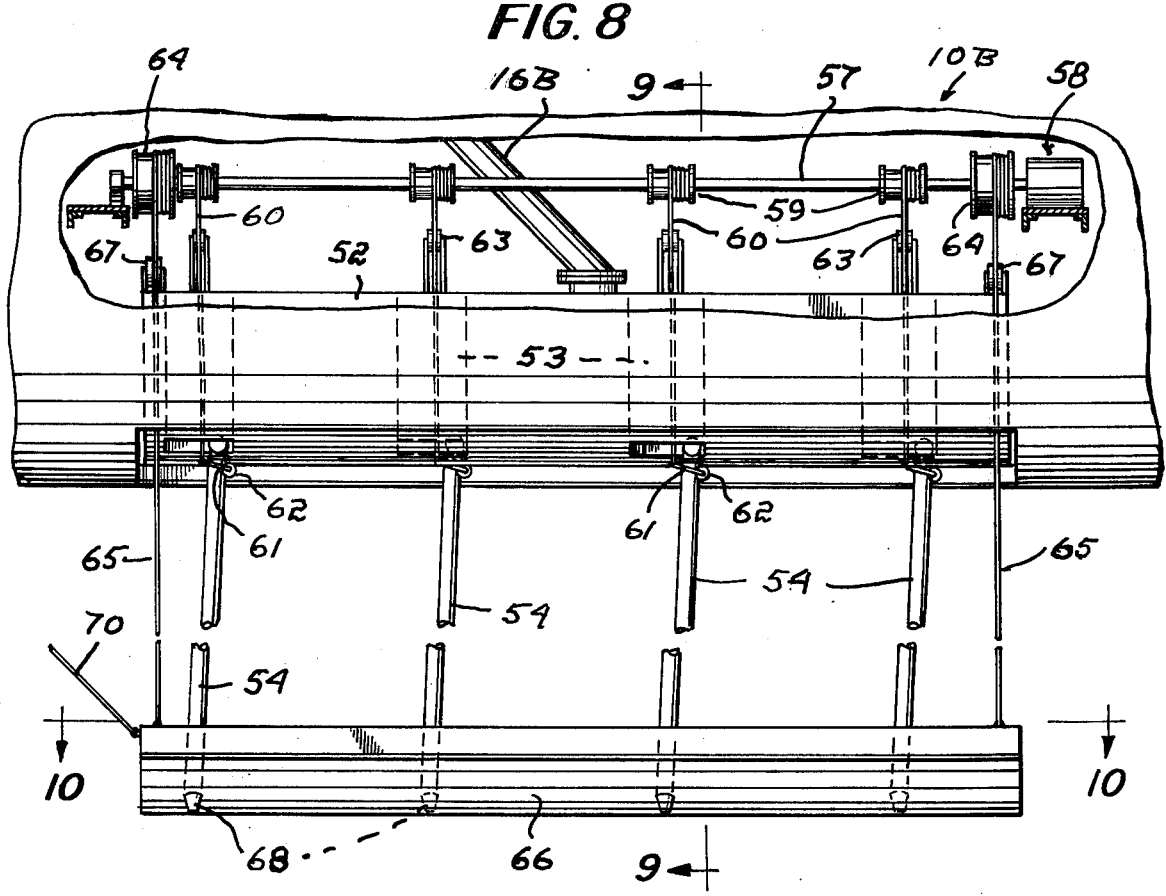
FIG. 8 is a similar view of an airship equipped with means to discharge water through a series of nozzles mounted in a holder.

Reference is now made to the embodiment of the invention illustrated by FIGS. 6 and 7. Where two different liquids are to be carried, the airship 10A is provided with a first tank 39 and a second tank 40, the second tank within and centrally of the first tank. The filling conduit 16A has branches 41 and 42 controlled by a three way valve 43, the branch 41 in communication with the tank 39 and the branch 42 in communication with the tank 40, the valve 43 being preferably of a remotely controlled type.

The tank 39 has a valve controlled outlet 44 to which is secured a relatively long, flexible conduit 45 and the tank 40 has its outlet controlled by a valve 46 and connected to a relatively long and flexible conduit 47 and the conduits 45 and 47 are both connected to a nozzle 48 provided with a three way valve 49 adapted to be manually operated at the receiving station. The nozzle 48 normally closes the port 33A.

The conduit 45 is normally stored as a lengthwise loop within the compartment 50 and the conduit 47 is normally stored as a lengthwise loop within the compartment 51 and each is lowered and raised in the same manner as the conduit 22 by the means previously described and the corresponding parts are indicated by the appropriate reference numerals distinguished by the suffix addition A, in the case of the conduit 45 and by the suffix addition B in the case of the conduit 47.

The airship tankers as thus far described are primarily designed for use in transporting oil or petroleum products and reference is now made to the embodiment of the invention illustrated by FIGS. 8 — 13 in which the air tanker 10B is for such uses as fighting forest fires, or spraying large drought areas.

The airship 10B has its tank 52 provided with a filler conduit 16B that is identical to that of the airship 10. The tank 52 has vertical passageways 53 spaced along each side. Flexible outlet conduits 54 of substantial length are placed in communication with the tank 52 by swivelled outlets 55, each located on a passageway 53 and provided with a valve 56 of a type that may be opened and closed from a remote station.

A shaft 57 above the tank 52 extends lengthwise and centrally thereof and has a reversible drive generally indicated at 58. The shaft 57 has a series of spools 59, one for each conduit 54 and located above the appropriate passageway 53. Each spool 59 has a cable 60 wound about it and provided with a yoke 61 rotatably supporting a pulley 62 over which an appropriate one of the conduits 54 is trained as a vertically disposed loop. Each cable 60 is also trained over a guide pulley 63 located at the upper end of the appropriate passageway 53. The shaft 57 is also provided with spools 64, each having a cable 65 wound about it. The cables 65 are connected to appropriate sides of a holder 66 adjacent its ends, each cable 65 trained over a pulley 67 holding it out of contact with the tank 52. Each conduit 54 has a nozzle 68 and the nozzles are mounted in the holder 66, two at each side thereof. By rotating the shaft 57 in one direction or the other, the holder 66 is lowered or raised and the conduits 54 paid out or reeled in. In the normal or raised position of the holder 66, the ports 69 for the conduits 54 and the cables 65 are closed.

In order to prevent the lowered holder 66 from swinging aft to an objectionable extent, its forward end has cables 70 secured thereto. Each cable 70 extends through a tubular arm 71 supported at one end by a shaft 72 and its other end is provided with a pulley 73 over which the appropriate cable 70 is trained. Each cable 70 is wound about a drum 74 whose shaft 75 is driven by a reversible motor 76. The shaft 72 has gears 77 at each end in mesh with the appropriate gears 78 on a shaft 79 rotated in one direction or the other by a reversible motor 80 to swing the arm 71 in one direction downwardly and forwardly as required to stabilize the fore and aft position of the holder 66 and in the other direction, to return the arms to storage.

I claim:

1. An airship comprising a framework, a gas tight envelope covering said framework, and a midship chamber supported by the framework, said chamber including a port opening through the bottom of the airship, at least one tank within said chamber and supported by the framework, an inlet conduit in communication with the tank, at least one flexible outlet conduit of substantial length having a normal stored position within said chamber in the form of a loop, valve controlled means connecting one end of said outlet conduit to said tank, the other end of said outlet conduit being positioned to pass through said port in response to gravity, and reversible power operated means connected to said outlet conduit and operable to pay out said outlet conduit through said port and to withdraw said outlet conduit therethrough and restore the stored position thereof, said power operated means including a winch provided with a cable, a pulley about which the the outlet conduit is trained and a yoke connecting the pulley to the cable.

2. The airship of claim 1 in which the loop extends lengthwise of the airship.

3. The airship of claim 1 in which the loop extends vertically relative to the airship.

4. The airship of claim 1 and a second reversible like power operated means is connected to said nozzle to cooperate with the first named power operated means in paying out and withdrawing the outlet conduit.

5. The airship of claim 1 and a second tank centered within the first named tank and spaced from the side walls thereof, the inlet includes valve controlled branches one in communication with each tank, a second flexible outlet conduit of substantial length having a normal stored position within the chamber, valve controlled means connecting one end of said second outlet conduit to said second tank, the other end of said second conduit also being positioned to pass through said port in response to gravity, and reversible power operated means connected to said second outlet conduit and operable to pay out said second outlet conduit and to withdraw it through said outlet port and restore the stored position thereof.

6. The airship of claim 5, a nozzle and valve means operable to connect either one of the outlet conduits thereto.

7. The airship of claim 1 in which the chamber has a plurality of ports and there are a plurality of flexible outlet conduits, one for each port and of substantial length having normal stored positions within the chamber, valve controlled means connecting one end of each of the outlet conduits to the tank, the other end of each outlet conduit including a nozzle in the appropriate port, a holder to which said nozzles are connected, in a predetermined spaced relationship and having a normal position closing said ports, and reversible power operated means connected to said outlet conduits and to said holder and operable to lower the holder to pay out the outlet conduits or to return said outlets to their stored positions and said holder to its normal position.

8. The airship of claim 7 and stabilizing means for said holder including cables secured to its forward end and reversible power operated means in said chamber operable to pay out and draw in said cable.

9. The airship of claim 8 in which the stabilizing means also includes a pair of tubular arms, reversible, power operated means within said chamber connected to said arms and operable to swing the arms downwardly and forwardly from a stored position, said stabilizing cables extending through said arms.

10. The airship of claim 7 in which the flexible outlet conduits are vertically disposed loops and the reversible power operated means includes a shaft extending lengthwise of the airship above the tank, the shaft has a first series of reels each provided with a cable, each conduit is trained about a pulley, and a yoke connects each pulley to the appropriate cable, and two additional reels, each provided with a cable and connected to the appropriate end of the holder.

11. An airship comprising a framework, a gas tight envelope covering said framework, an upper deck, and a midship chamber including a port opening through the bottom of the airship, at least one tank within said chamber and supported by the framework, an inlet conduit in communication with the tank with its inlet end exposed in said upper deck relatively near the nose of the airship, at least one flexible outlet conduit of substantial length having a normal stored position within said chamber with one end connected to said tank, valve means in control of said outlet conduit, means operable to pay out the other end of the conduit through the port and to withdraw it therethrough, and a mooring mast including a turntable to which the nose of the airship is secured and a rotatable counterweighted boom above the turntable and of a length to extend lengthwise of the airship into a position substantially over said inlet end of the inlet conduit, and a liquid delivery conduit including a portion extending through said boom and rotatable therewith, said portion including a flexible exposed portion disposable in said inlet end.

* * * * *